US012278062B2

(12) United States Patent
Han et al.

(10) Patent No.: US 12,278,062 B2
(45) Date of Patent: Apr. 15, 2025

(54) RUBBER AND METAL COMPOSITE ELECTRIC CONTACT AND PREPARATION METHOD THEREFOR

(71) Applicant: NANTONG MEMTECH TECHNOLOGIES CO., LTD, Jiangsu (CN)

(72) Inventors: Huisheng Han, Jiangsu (CN); Yang Ding, Jiangsu (CN); Lu Chen, Jiangsu (CN); Hongmei Zhang, Jiangsu (CN); Linyu Ye, Jiangsu (CN); Xiaosheng Wu, Jiangsu (CN); Guoqiang Wu, Jiangsu (CN); Cheng Huang, Jiangsu (CN)

(73) Assignee: NANTONG MEMTECH TECHNOLOGIES CO., LTD, Jiangsu (CN)

( * ) Notice: Subject to any disclaimer, the term of this patent is extended or adjusted under 35 U.S.C. 154(b) by 272 days.

(21) Appl. No.: 18/029,379

(22) PCT Filed: Sep. 22, 2021

(86) PCT No.: PCT/CN2021/119505
§ 371 (c)(1),
(2) Date: Mar. 30, 2023

(87) PCT Pub. No.: WO2022/068636
PCT Pub. Date: Apr. 7, 2022

(65) Prior Publication Data

US 2023/0360865 A1 Nov. 9, 2023

(30) Foreign Application Priority Data

Sep. 30, 2020 (CN) ........................ 202011055242.2

(51) Int. Cl.
*H01H 1/021* (2006.01)
*H01H 11/04* (2006.01)

(52) U.S. Cl.
CPC ............ *H01H 1/021* (2013.01); *H01H 11/04* (2013.01)

(58) Field of Classification Search
CPC ........... H01H 11/06; H01H 1/04; H01H 1/021
See application file for complete search history.

(56) References Cited

U.S. PATENT DOCUMENTS 6,475,933 B1 11/2002 Brown et al.
7,964,810 B2 6/2011 Keist et al.
2004/0242095 A1 12/2004 Prakash

FOREIGN PATENT DOCUMENTS

CN 101171654 11/2010
CN 102176341 9/2011

(Continued)

OTHER PUBLICATIONS

"International Search Report (Form PCT/ISA/210) of PCT/CN2021/119505," mailed on Nov. 25, 2021, with English translation thereof, pp. 1-5.

(Continued)

*Primary Examiner* — Khanh T Nguyen
(74) *Attorney, Agent, or Firm* — JCIPRNET

(57) ABSTRACT

A rubber and metal composite electric contact and a preparation process therefor. The rubber and metal composite electric contact is a circular layered complex which is formed by tightly combining a metal sheet layer having a plurality of through holes and a rubber layer by means of thermal vulcanization molding and which has a thickness of 0.1 to 5 mm and a diameter of 1 to 15 mm. There is no isolation layer between the rubber layer and the metal layer of the electric contact, so no rubber overflows the outer surface of the metal layer. In the rubber and metal composite (Continued)

electric contact, the rubber and metal are combined firmly and the overall strength of the electric contact is adjustable; the electric contact also has good dust resistance; and the electric contact thus has stable and reliable electrical conductivity.

10 Claims, 3 Drawing Sheets

(56) References Cited

FOREIGN PATENT DOCUMENTS

| | | | | |
|---|---|---|---|---|
| CN | 102176341 B | | 7/2013 | |
| CN | 102169760 | | 8/2013 | |
| CN | 102354629 | | 2/2014 | |
| CN | 102166801 | | 11/2014 | |
| CN | 102623196 | | 11/2014 | |
| CN | 102501460 | | 2/2015 | |
| CN | 102623197 | | 4/2015 | |
| CN | 103700517 | | 10/2015 | |
| CN | 104217878 | | 6/2016 | |
| CN | 104112607 | | 8/2016 | |
| CN | 106340406 | | 1/2017 | |
| CN | 106393873 A | * | 2/2017 | ............ B32B 15/14 |
| CN | 106409539 | | 2/2017 | |
| CN | 107610948 | | 11/2018 | |
| CN | 106393873 | | 5/2019 | |
| CN | 111048340 | | 4/2020 | |
| CN | 106340406 B | | 9/2020 | |
| CN | 112259386 | | 1/2021 | |
| CN | 106373792 | | 6/2021 | |
| CN | 111029181 | | 5/2022 | |
| CN | 111653438 | | 10/2022 | |
| WO | 2006134715 | | 12/2006 | |
| WO | 2019087627 | | 5/2019 | |

OTHER PUBLICATIONS

"Written Opinion of the International Searching Authority (Form PCT/ISA/237) of PCT/CN2021/119505," mailed on Nov. 25, 2021, pp. 1-4.

* cited by examiner

RUBBER AND METAL COMPOSITE ELECTRIC CONTACT AND PREPARATION METHOD THEREFOR

CROSS-REFERENCE TO RELATED APPLICATION

This application is a 371 of international application of PCT application serial no. PCT/CN2021/119505, filed on Sep. 22, 2021, which claims the priority benefit of China application no. 202011055242.2, filed on Sep. 30, 2020. The entirety of each of the above mentioned patent applications is hereby incorporated by reference herein and made a part of this specification.

TECHNICAL FIELD

The present invention relates to the field of electric contact materials, and more particularly relates to a rubber and metal composite electric contact.

BACKGROUND ART

Electric contacts (rubber-based electric contacts are also known as conductive particles) are key parts of rubber keys, working surfaces of which have electrical conduction function. When a rubber key is pressed, the working surface of an electric contact contacts switch components on a printed circuit board (PCB), for example, “gold finger” or double half-moon gold points, so that a PCB circuit is connected. Especially, when a rubber key is used in occasions involving safety issues for example, automobiles or power tools, electric contacts need to provide good reliability of conductivity.

The U.S. Pat. No. 6,475,933 titled “Highly Conductive Elastomeric Sheet” discloses a highly conductive elastomeric sheet consisting of a conductive wire mesh and an elastomeric substrate loaded with conductive particulates, where the conductive particulates are submicron-sized carbonaceous materials. The U.S. patent application No. 20040242095 titled “Composites Reinforced by Wire Net or Mesh for Light Weight, Strength and Stiffness” discloses a composite material having a polymer or a metal substrate that is reinforced by one or more of a net or a mesh or a screen structure. The U.S. Pat. No. 7,964,810 titled “Electrically Conducting Contact and Method for Production Thereof”, the Chinese Patent 200680015484.0 titled “Conductive Contact Part and Manufacturing Method Therefor” and the Chinese Patent 201610923294.4 titled “Method for Manufacturing Superconducting Electric Particles” all disclose an electric contact made of a metal sponge at least partially permeate by an elastomeric material. The Chinese Patent 201010609386.8 titled “Conductive Rubber and Application Thereof” discloses a method for producing electric contacts by using metal fiber sintered felt instead of metal sponge, metal foam or metal mesh combined with rubber composite. The Chinese Patent 201010609385.3 titled “Production Method of Conductive Particles for Buttons” discloses a method for preparing conductive particles for buttons by injecting polymer materials by means of molding or injection molding after placing a metal embedded member (for example, spiral metal wire) into a mold cavity. The Chinese Patent 201010592410.1 titled “Composite Conductive Sheet” provides a conductive composite sheet consisting of a polymer substrate and a metal foil composited therein, where the metal foil is an inlaid foil, copper foil, aluminum foil, stainless steel foil, gold foil or silver foil containing protruding contacts and holes, or a woven mesh of silver, copper, aluminum, stainless steel, gold or silver wire containing protruding contacts and holes. The Chinese Patent Application 201610780383.8 titled “High Polymer Material and Metal Composite Material and Preparation Process Therefor”, and the Chinese Patent Application No. 201610781956.9 titled “Composite Material and Preparation Method Therefor” disclose the methods of removing extractable substances by means of extraction and of removing volatile substances in the rubber by means of baking, respectively, so that the rubber in the composite material shrinks or collapses, and the porous metal protrudes from the surface of the conductive composite material, making the composite material very suitable for use as an electric contact material. The Chinese Patent 201110193369.5 titled “Pockmarked Metal and Rubber Composite Conductive Particle” provides a pockmarked metal and rubber composite conductive particle with concaves and convexes. The Chinese Patent 201110027418.8 titled “Rubber Conductive Particle and Preparation Method Therefor” provides a conductive particle with metal coating on the surface of a rubber substrate. The Chinese Patent No. 201210090165.3 titled “Soft Metal Surface and polymer material Composite Conductive Particle” discloses a soft metal surface and polymer material composite conductive particle. The Chinese Patent 201310748955.0 titled “Switch Contact Element and Preparation Method Therefor” discloses a switch contact element with three-layer layered structure of silicone rubber, continuous base metal sheet and discontinuous precious metal coating. The Chinese Patent 201410346509.1 titled “Gold-plated Switch Contact and Preparation Method Therefor” discloses a switch contact element with three-layer layered structure of hydrophobic rubber layer, metal sheet layer and gold-plated layer, and a preparation method therefor. The Chinese Patent 201410467116.6 titled “Precious Metal-plated Switch Contact Element and Preparation Method Therefor” discloses a method for preparing a precious metal switch contact element through plating resistance, plating and etching processes. The Chinese Patent 201610798351.0 titled “Composite Sheet of Multilayer Porous Metal and Polymer Material” discloses a composite sheet of two or more layers of porous metal and polymer material, and an electric contact made of the composite sheet that the material composition on two surfaces thereof is consistent. The Chinese Patent Application 201911322558.0 titled “Locally Plated Electric contact” discloses an electric contact with metal coating on a metal plating layer with local convexes. The Chinese Patent application Ser. No. 20/191,1322759.0 titled “Method for Improving Reliability of Rubber and Metal Composite Electric contact” discloses a method for improving the reliability of rubber and metal composite electric contact by a fresh inner surface of a metal sheet. The Chinese Patent Application No. 202010679934.8 titled “Burr-resistant Electric contact” discloses a burr-resistant electric contact in which an edge portion of a metal layer is bent toward a rubber layer.

None of the above patents relate to or disclose how to ensure that there is no rubber overflow on the working surface of the rubber and metal composite electric contact. The term “rubber overflow” refers to the situation that the rubber is extruded under pressure and flows to the working surface of the electric contact, then vulcanized and adhered onto the working surface of the electric contact in the process of thermal vulcanization molding when the rubber and metal composite electric contact is prepared. Rubber is generally non-conductive, and even if rubber is conductive, its conductivity is far less than that of metal. Therefore, the rubber overflow phenomenon will have a negative impact on the electrical conductivity of the electric contact. Although a rubber and metal composite electric contact prepared by compounding rubber and metal sheets without through holes can prevent rubber from overflowing onto the working surface of electric contact and avoid the problem of rubber overflow, this type of electric contacts has relatively greater mechanical strength, and poor dust resistance and oil stain resistance. A rubber and metal composite electric contact prepared by compounding rubber and porous metal sheets (for example, metal fiber sintered felt, metal foam or metal sponge) has good dust resistance and oil stain resistance, but this type of electric contacts is unable to guarantee the distribution stability of the metal convexes in the working surface of electric contacts and ensure that the metal convexes are not covered by the rubber.

The applicant of the present patent has made research and development to ensure the electrical conductivity reliability of rubber and metal composite electric contacts. The Chinese Patent Application 201610771886.9 titled "Polymer-based Composite Material and Preparation Process Therefor" discloses a polymer-based composite material and preparation process therefor. A composite material sheet is prepared by compounding a metal sheet and a polymer, and the metal layer in the composite material sheet is then etched to obtain holes perpendicular to the metal layer, but the polymer layer in the composite material sheet is not affected by etching. Since the metal layer having holes in the polymer-based composite material prepared in this way is evenly covered on the polymer substrate, the thermal expansion of the polymer substrate does not make the polymer substrate protrude to the surface of the metal layer with a certain thickness, that is to say, the thickness of the metal layer can offset the thermal expansion of the polymer substrate, therefore, the composite material is suitable for use as an electric contact material under various meteorological conditions. However, in the actual operation process, acidic conditions (acidic etching solution) and alkaline conditions (alkaline adhesives removal solution) used in the process damages the bonding strength between rubber and metal of the electric contact, while acidic conditions and alkaline conditions promote the separation between rubber and metal of the electric contact. Especially, when the metal is etched into metal lines or metal meshes with a very small line width (for example, the line width is not greater than 0.2 mm), the metal layer can be separated from the rubber layer by itself, and even the metal layer can be easily separated from the rubber layer through a gentle touch by hand. Neither the tackifying treatment of the metal nor use of the self-adhesive rubber can prevent the damage from acidic and alkaline conditions used in the process on the bonding strength between rubber and metal of the electric contact.

In order to prevent the rubber layer protruding from the working surface of the electric contact in the process of thermal vulcanization molding, the Chinese Patent 201110335410.8 entitled "Rubber Conductive Plate and Conductive Particles with Multi-layer Structure" provides a rubber conductive plate and conductive particles with a multi-layer structure, which is composed of a conductive layer, a transition layer and an elastic layer (rubber layer), the conductive layer and elastic layer are completely separated by the transition layer, preventing the elastic layer from protruding out of the conductive layer (that is, overflowing rubber) and thus affecting the electrical conductivity, and the transition layer is equivalent to an isolation layer, which consists of polymer film or dense metal sheet, and plays a role in preventing the rubber from penetrating into the conductive layer.

SUMMARY OF INVENTION

Objectives of the present invention: in order to improve the defects in the prior art, the present invention provides a rubber and metal composite electric contact and a preparation process therefor, there is no isolation layer between the rubber layer and the metal layer of the electric contact, so no rubber overflows the working surface (the outer surface of the metal layer) of the electric contact, the rubber and metal are combined firmly, the electric contact also has good dust resistance and oil stain resistance, and the electric contact thus has reliable electrical conductivity.

Technical solution: the present invention provides a rubber and metal composite electric contact and a preparation process therefor. The rubber and metal composite electric contact is a circular layered complex which is formed by tightly combining a metal sheet layer having a plurality of through holes and a rubber layer by means of thermal vulcanization molding and which has a thickness of 0.1-5 mm and a diameter of 1-15 mm, where the metal sheet layer has a thickness of 0.005-0.5 mm, the layered complex has a thickness of 0.1-5 mm, and the outer surface of the rubber layer has cylindrical, pillar-shaped, prismatic or hemispherical convexes with a diameter of cross-sectional circumcircle less than or equaling to 1 mm and a height of 0-4.75 mm; the outer surface of the metal layer of the rubber and metal composite electric contact has neither adhesive rubber nor rubber overflow, so that the electric contact has stable and reliable electrical conductivity; moreover, in the rubber and metal composite electric contact, the overall strength of the electric contact is adjustable, the rubber and metal are combined firmly, there is no isolation layer or transition layer between the rubber layer and the metal layer, and the electric contact also has good dust resistance.

There is no isolation layer or transition layer between the rubber layer and the metal layer of the rubber and metal composite electric contact disclosed by the present invention, which not only simplifies the process and obtains technical effects, for example, no rubber overflow, but also eliminates the risk of bonding failure between rubber layer and isolation layer or transition layer, as well as between metal sheet layer and isolation layer or transition layer due to the existence of isolation layer or transition layer. That is to say, the increase in the number of layers in the electric contact means a more complicated preparation process for the electric contact and a higher risk.

The surface of the rubber layer can be divided into an inner surface and an outer surface. The inner surface of the rubber layer refers to the surface where the rubber layer and the technical sheet layer are bonded, and the outer surface of the rubber layer refers to the surface that is exposed and corresponds to the inner surface. When a rubber key containing an electric contact is prepared, the outer surface of the rubber layer is used for bonding between the electric contact and a rubber substrate. The outer surface of the rubber layer has three or more cylindrical, pillar-shaped, prismatic or hemispherical convexes with a diameter of cross-sectional circumcircle less than or equaling to 1 mm and a height of 0-4.75 mm, which aims to increase the changes in an axial linear density of the electric contact, to make the axial linear density at the outer surface of the rubber layer of the electric contact small, so that subsequent use of the electric contact to prepare keys is convenient, time-saving, conducive to mass production. The convexes made of rubber are basically irrelevant to electrical conductivity of the electric contacts.

When rubber and metal are thermally vulcanized and compounded, the rubber flows to the outer surface of the metal under the action of pressure, then solidifies and adheres to the outer surface of the metal, leading to the phenomenon of rubber overflow. With respect to the through-hole metal, it is difficult to present the rubber from overflowing through the through holes of the metal under the action of pressure. This is exactly why the Chinese Patent No. 20111335410.8 entitled "Rubber Conductive Plate and Conductive Particles with Multi-layer Structure" applies a transition layer (polymer film or dense metal sheet) between the conductive layer (metal) and the elastic layer (rubber layer) to completely separate the conductive layer from the elastic layer to prevent the elastic layer, preventing the elastic layer from protruding out of the conductive layer (namely, resulting in the rubber overflow) and thus affecting the electrical conductivity. The transition layer, also known as the isolation layer, plays a role in preventing the rubber from passing through the holes of the metal and resulting in the rubber overflow.

Rubber lacks conductivity, and causes the rubber overflow, which affect the electrical conductivity of the rubber and metal composite electric contact. A rubber and metal composite electric contact disclosed by the present invention does use an isolation layer or a transition layer between the rubber and the through-hole metal that prevents the rubber from passing through the holes and resulting in the rubber overflow, thus eliminating the problem of rubber overflow.

The present invention discloses a rubber and metal composite electric contact in which through holes in the metal sheet are filled with the rubber but the rubber does not protrude from the outer surface of the metal sheet layer. Although the through holes in the metal sheet are filled with the rubber, there is no rubber overflow on the metal sheet. Apart from being free from the rubber overflow, the metal sheet layer and the rubber layer of the rubber and metal composite electric contact disclosed by the present invention is firmly bound. Moreover, the failure mode of the initial bonding between the metal sheet layer and the rubber, and the bonding failure mode after a high-temperature and high-humidity aging test at a temperature of 85° C., a relative humidity of 85%, and a duration of 168 h are both cohesive failure. When the rubber is stripped or peeled off from the metal sheet, the adhesive surface of the metal sheet has the rubber residue, the area of which is not lower than 10% of the total bonding area. Obviously, separation of the metal and the rubber, if any, of the rubber and metal composite electric contact is a very serious quality problem, which will not only cause the function failure of the electric contact, but also the separated metal could be connected to the PCB circuit uncontrollably, thereby resulting in the safety accident.

The metal sheet layer of the rubber and metal composite electric contact has a plurality of evenly distributed or randomly distributed through-hole holes, and the holes in the metal sheet layer are partially or completely filled with rubber. No matter the hole of the metal sheet layer is partially or fully filled with rubber, no rubber is adhered to the outer surface of the metal sheet layer, or no rubber overflows the outer surface of the metal sheet layer.

Further, the through holes of the metal sheet layer have a hole diameter of 50 μm-1.0 mm and a hole spacing of 25 μm-1.0 mm, and a cross-section of the holes is an axisymmetric or centrosymmetric plane figure, for example, a circle, an ellipse, a rectangle, a rhombus, an isosceles trapezoid, or a regular polygon.

In the present invention, any rubber that can be thermoset-formed or thermoplastic-formed can be used to prepare the present rubber and metal composite electric contact. More specifically, the rubber in the rubber and metal composite electric contact in the present invention is natural rubber, ethylene propylene rubber, ethylene propylene diene monomer rubber, diene rubber, acrylic ester rubber, polyurethane rubber, silicone rubber, fluorosilicone rubber or thermoplastic elastomer.

As a preferred embodiment, the rubber in the rubber and metal composite electric contact may be vulcanized from liquid silicone rubber or solid silicone rubber. Silicone rubber is well known for its good chemical stability and elasticity. When rubber and metal are thermally vulcanized and compounded, the metal may be subject to tackifying pre-treatment. Surely, it may not perform the tackifying treatment of the metal, and the rubber used therein is self-adhesive liquid silicone rubber or self-adhesive solid silicone rubber. Under the condition that the self-adhesive liquid silicone rubber or self-adhesive solid silicone rubber is used, it is unnecessary to perform the tackifying treatment of the metal sheet, but the firmly bonding liquid silicone rubber or solid silicone rubber is obtained during vulcanization molding or when being compounded with the metal sheet.

In order to not only make the rubber and metal composite electric contact free from rubber overflow, but also make the conductive metal material protrude slightly, and the non-conductive rubber material slightly concave in the working surface of the rubber and metal composite electric contact, the rubber material of the present invention has been further improved: before being compounded with the metal sheet through thermal vulcanization molding, the rubber in the rubber and metal composite electric contact contains 1-50 wt % of volatile substances, extractable substances or soluble substances; the volatile substances contained in the rubber before being compounded with the metal sheet through thermal vulcanization molding in the rubber and metal composite electric contact are organic solvents with a boiling point higher than the temperature of thermal vulcanization molding, or iodine, 1,2,4,5-tetramethylbenzene, mixed tetramethylbenzene, p-dichlorobenzene, phenol, adamantane, naphthalene, anthracene, phenanthrene, camphor, menthol or caffeine; the extractable substances or the soluble substances contained in the rubber before being compounded with the metal sheet through thermal vulcanization molding in the rubber and metal composite electric contact are water-soluble inorganic salts or organic salts, surfactants, sugars, fats, organic amines, alcohol amines, monosodium glutamate, amino acid, oxalic acid, simethicone, liquid paraffin, chlorinated paraffin, naphthalene, tetrahydronaphthalene, decahydronaphthalene, trimethylbenzene, 1,2,4,5-tetramethylbenzene, mixed tetramethylbenzene, hexamethylbenzene, or organic solvents or oils with a boiling point higher than 175° C. Water, an aqueous solution containing a surfactant, or a low-boiling solvent may be used as an extracting solvent.

The metal sheet in the rubber and metal composite electric contact is made from aluminum, iron, cobalt, silver, copper, zinc, tin, manganese, tungsten, silver or gold, or homogeneous or heterogeneous metals composed of alloys of the same; the metal sheet is made of one layer of metal material, or is compounded by two or more of layer, and the metal sheet may contain a metal plating; an inner surface or an outer surface of the metal sheet may be coated with a layer of bonding promoter, coupling agent or primer with an average thickness not greater than 1μ.

The preparation process for a rubber and metal composite electric contact includes the following steps:

cleaning treatment: cleaning a smooth and flat stainless steel sheet with a thickness of 0.005-0.5 mm to remove dust, particles, oil stains and rust spots on the surface of the metal sheet and keep the surface of the metal sheet clean;

anti-corrosion treatment: adhering a pressure-sensitive adhesive tape or a pressure-sensitive adhesive sheet with a thermal-resistant polymer film being a substrate to one side of the clean metal sheet, and protecting the side of the metal sheet completely with a protective ink or coating; and protecting the part having no need of etching of the other side of the metal sheet with ink or coating, so that the metal surface needing to be etched is exposed, so as to be etched into through holes by a suitable etchant;

etching: putting the metal sheet after anti-corrosion treatment into a corrosion tank for etching, etching through-hole holes on the metal sheet by chemical or electrochemical method, taking out the metal sheet, using solvent or alkaline aqueous solution to remove protective ink or coating to make it clean;

tackifying treatment: when the rubber used is non-self-adhesive rubber, treating one side of the obtained metal sheet that has been bonded to the rubber, or both sides of the obtained metal sheet with the bonding promoter, coupling agent or primer capable of increasing the bonding strength of the metal sheet and the rubber, and having the thickness of dry film deposited on the metal sheet by the bonding promoter, coupling agent or primer less than 1 μm; when the rubber used is self-adhesive rubber, the self-adhesive rubber a rubber capable of firmly bonding with the metal sheet without tackifying treatment by means of thermal vulcanization molding, therefore, the step of tackifying treatment may be omitted.

thermal vulcanization molding: putting the metal sheet obtained in the anti-corrosion treatment and protected by a pressure-sensitive adhesive tape or a pressure-sensitive adhesive sheet with a thermal-resistant polymer film being a substrate into a mold cavity, or adhering a pressure-sensitive adhesive tape or a pressure-sensitive adhesive sheet with a thermal-resistant polymer film being a substrate to one side of the metal sheet that is completely protected with a protective ink or coating, then putting it into a flat-bottomed mold, and putting the gross rubber containing the vulcanizing agent on the metal sheet and close the mold to perform the thermal vulcanization molding, so as to obtain a layered complex composed of metal sheet having holes and rubber with a thickness of 0.1-5 mm; and slitting: tearing off the pressure-sensitive adhesive tape or the pressure-sensitive adhesive sheet with a thermal-resistant polymer film being a substrate attaching to the metal sheet with holes; extracting volatile substances or extractable substances contained in the rubber of the layered complex composed of the metal sheet having holes and rubber through heating before or after slitting processing; and slitting and processing the layered complex composed of metal sheet with holes and rubber to be a circular layered complex with a diameter of 1-15 mm through mechanical punching or laser cutting, to obtain a rubber and metal composite electric contact.

The thermal-resistant polymer film is a polymer film that does not shrink significantly and remains solid within 15 min at the vulcanization molding temperature of the rubber used, or a polypropylene film, a polyester film, a polyurethane film or a polyimide film of which the heat deflection temperature is higher than the vulcanization molding temperature of the rubber used. The pressure-sensitive adhesive tape (or known as the pressure-sensitive tape) or the pressure-sensitive adhesive sheet (or known as the pressure-sensitive sheet) with a thermal-resistant polymer film being a substrate has certain high temperature resistance characteristics, so that it can remain solid without being melted at the vulcanization molding temperature (for example, falling within 100-190° C.). Pressure-sensitive adhesive tapes or adhesive sheets are in ample supply on the market in various specifications, and are cheaper than metal sheets (silver sheets, copper sheets, and the like).

In the present invention, in the process of preparing the rubber and metal composite electric contact, correct use of the pressure-sensitive adhesive tape or the pressure-sensitive adhesive sheet with a thermal-resistant polymer film being a substrate is the key to prepare and obtain electric contact without the phenomenon of rubber overflow. The pressure-sensitive adhesive tape or the pressure-sensitive adhesive sheet with a thermal-resistant polymer film being a substrate is adhered to the metal sheet having through holes, put together with the rubber into the flat-bottomed mold, and be subjected to thermal vulcanization molding under the action of pressure to obtain a layered complex composed of metal sheet having holes and rubber. After the thermal vulcanization molding is completed, no rubber is found penetrating through the through holes and penetrating into the outer surface of the metal sheet under the action of pressure. That is to say, as long as sufficient adhesion is applied between the pressure-sensitive adhesive tape or the pressure-sensitive adhesive sheet with a thermal-resistant polymer film being a substrate and the metal sheet (180° peel strength is not lower than 1 N/cm), the composite electric contact composed of rubber and metal with through holes according to the method disclosed in the present invention does not have the phenomenon of rubber overflow. Moreover, in the tests of preparing electric contacts in large batches by adopting the method disclosed in the present invention, there is no phenomenon of rubber overflow, which proves the method can reliably eliminate the problem of rubber overflow.

When the vulcanization temperature of rubber is 100° C., a polypropylene pressure-sensitive adhesive tape or adhesive sheet can be selected and used. When the vulcanization temperature of rubber is 150° C., a polyester or polyimide pressure-sensitive adhesive tape or adhesive sheet can be selected and used. When the vulcanization temperature of rubber is 180° C., a polyimide pressure-sensitive adhesive tape or adhesive sheet can be selected and used. In short, the thermal-resistant temperature of the polymer film substrate in the pressure-sensitive adhesive tape or adhesive sheet used is higher than the thermal vulcanization molding temperature of the rubber used.

The 180° peel strength between the pressure-sensitive adhesive tape or the pressure-sensitive adhesive sheet with a thermal-resistant polymer film being a substrate and the smooth metal sheet without holes preferably falls within 1-15 N/cm. Under the condition that the peel strength between the metal sheet and a pressure-sensitive adhesive tape or adhesive sheet used is extremely low (for example, lower than 1 N/cm), it cannot effectively prevent the rubber from overflowing the outer surface of the metal sheet having through holes in the vulcanization molding process; but under the condition that the peel strength is extremely high, tearing off the pressure-sensitive adhesive tape or adhesive sheet after vulcanization molding may cause creases, cracks and other defects on the metal sheet with through holes.

In the process that the rubber and the metal sheet is subjected to thermal vulcanization molding to form a complex sheet, the rubber flows and fills voids in the mold cavity under the vulcanization pressure, and some rubber even enters tiny voids between the upper and lower templates after the mold is closed and forms burrs. However, when making electric contacts according to the method in the present invention, the rubber does not flow between the pressure-sensitive adhesive tape (or pressure-sensitive adhesive sheet) and the metal sheet layer, and the 180° peel strength between the pressure-sensitive adhesive tape (or pressure-sensitive adhesive sheet) and the smooth metal sheet without holes is only 1 N/cm.

The thickness of the pressure-sensitive adhesive tape or the pressure-sensitive adhesive sheet with a thermal-resistant polymer film being a substrate is preferably not greater than 0.5 mm.

After the pressure-sensitive adhesive tape or adhesive sheet is torn off upon vulcanization molding, the outer surface of the rubber and metal complex is wiped without any solvent, wiped with alcohol, and wiped with ethyl acetate, respectively. The objective of wiping with solvent is to remove the residual pressure-sensitive adhesive tape or adhesive sheet that may leave on the outer surface of the rubber and metal complex. The electric contact prepared by wiping without any solvent, wiping with alcohol, and wiping with ethyl acetate is subjected to the surface contact resistance and life test, and the test results show that wiping has basically no influence on the surface contact resistance and life test.

Beneficial effects: no rubber overflow is found on the working surface of rubber and metal composite electric contact disclosed in the present invention, so that the electric contact has stable and reliable electrical conductivity; moreover, in the rubber and metal composite electric contact, there is no isolation layer between the rubber layer and the metal layer, the rubber and metal are combined firmly, the overall strength of the electric contact is adjustable, and the electric contact thus has stable and reliable electrical conductivity. Furthermore, the preparation method for the rubber and metal composite electric contact disclosed in the present invention is simple, easy to operate, readily available in raw materials and controllable in cost, but has unexpected effect, so that the method is especially suitable for mass production to meet rigorous performance requirements of rubber and metal composite electric contact.

DESCRIPTION OF EMBODIMENTS

The present invention will be further described below in conjunction with specific examples.

Example 1

Figure 1:
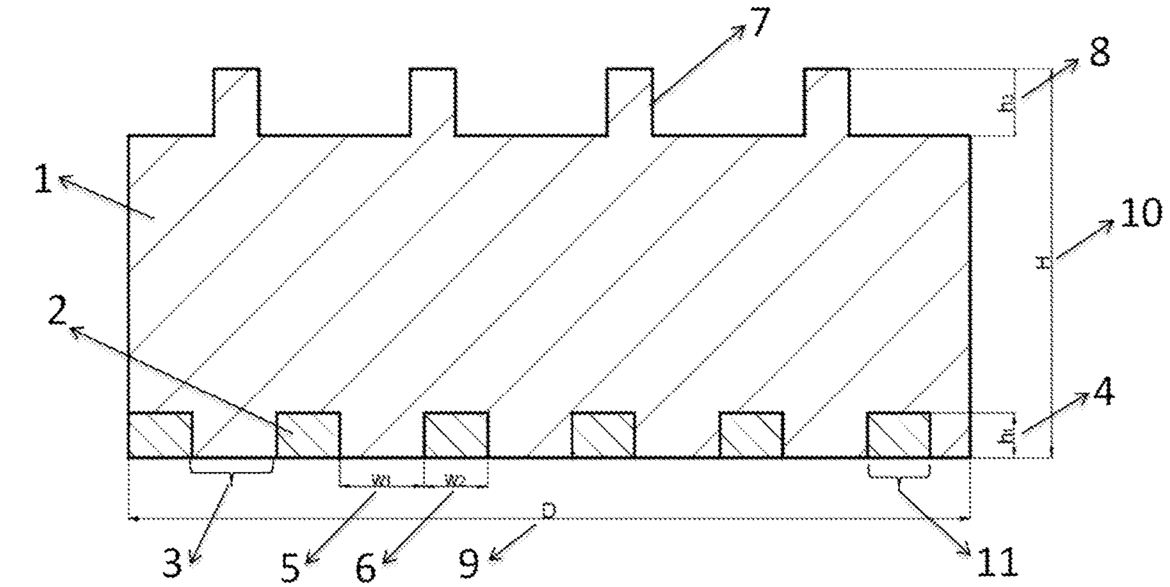
FIG. 1 is a schematic sectional view of a rubber and metal composite electric contact, in which: 1. rubber; 2. metal layer; 3. through hole; 4. thickness of metal; 5. side length of a square through hole; 6. width of metal between adjacent square through holes; 7. cylindrical convex; 8. height of cylindrical convex; 9. diameter of electric contact; 10. thickness of electric contact; and 11. working surface of electric contact.

A rubber and metal composite electric contact, the structure of which is shown in FIG. 1. The rubber (1) in the electric contact is silicone rubber, and a metal layer (2) of the electric contact consists of a 304 stainless steel sheet with evenly arranged square through holes (3), where the thickness of the stainless steel sheet $h_1$ (4) is 0.025-0.25 mm, the side length $w_1$ (5) of each square through hole is 0.1-1.0 mm, the distance between adjacent square through holes (that is, the width of metal between adjacent square through holes) $w_2$ (6) is 0.05-1.0 mm, and the square through holes of a metal sheet are filled with silicone rubber. Due to limitations of the molding process disclosed in the present invention, the silicone rubber does not protrude from the outer surface of the metal sheet, nor does it flow to the outer surface of the metal sheet, namely, a working surface 11 of the electric contact, under the pressure of the vulcanization molding, so that there is no problem of rubber overflow caused by silicone rubber bonding to the outer surface of the metal sheet.

The outer surface of a rubber layer of the rubber and metal composite electric contact has 4-100 cylindrical convexes (7) with a diameter of cross-sectional circumcircle of 0.25-0.75 mm, and the height of each convex $h_3$ (8) is 0.2-2.0 mm. The rubber and metal composite electric contact is a small circular piece with a total diameter D (9) of 2-10 mm and a total height H (10) of 0.5-2.5 mm.

The rubber and metal composite electric contact is prepared by the following process:

cleaning treatment: under the action of ultrasonic waves, a smooth and flat 304 stainless steel sheet with a thickness of 0.025-0.25 mm was cleaned with an alkaline cleaning solution at a temperature of 50-100° C., then rinsed with tap water, cleaned with deionized water, and dried in the sun or baked to remove dust, particles, oil and rust on the surface of the 304 stainless steel sheet and keep the surface of the sheet clean.

Anti-corrosion treatment: one surface of the stainless steel sheet was printed with a layer of alkali-soluble protective ink. The other surface of the stainless steel sheet was printed with a layer of alkali-soluble photosensitive ink by a screen plate and then exposed to light, so that the exposed portion was cross-linked into an adhesive film insoluble in tap water. The portion not exposed to light was dissolved and washed with tap water to reveal the stainless steel sheet surface with a square side length of 0.1-1.0 mm. The distance between adjacent surfaces of the exposed square stainless steel sheet was 0.05-1.0 mm.

Etching: the stainless steel sheet after anti-corrosion treatment was put into a corrosion tank with ferric chloride etching solution for etching, and square through holes with a side length of 0.1-1.0 mm evenly distributed on the stainless steel sheet were etched. The stainless steel sheet was then taken out and an alkaline aqueous solution was used to remove the protective ink layer. Under the action of ultrasonic waves, the stainless steel sheet having through holes was cleaned again, then rinsed with tap water, cleaned with deionized water, and dried in the sun or baked again, after then, the stainless steel sheet having through holes was further cleaned with a hydrocarbon solvent in a solvent cleaning machine to keep the surface of the sheet clean.

Tackifying treatment: the clean stainless steel sheet having through holes was put into an ethanol solution of 2 wt % of vinyl tri-tert-butylperoxysilane, taken out after being soaked for about 5 s, and dried in the sun or baked.

Thermal vulcanization molding: a single-sided polyimide pressure-sensitive adhesive tape with a thickness of 0.025 mm and a 180° peel strength between the stainless steel sheet falling within 2-5 N/cm was selected and adhered to one surface of the stainless steel sheet having through holes, and air bubbles between the polyimide pressure-sensitive adhesive tape and the metal were eliminated through compaction during lamination;

1.0 wt % of peroxide crosslinking agent dicumyl peroxide (DCP) was added to a silicone rubber compound (the brand used there is KE-951 produced by Shin-Etsu Chemical Co., Ltd.), which was mixed evenly to obtain a gross rubber containing a vulcanizing agent; and the stainless steel sheet having through holes to which one surface was adhered the polyimide pressure-sensitive adhesive tape was put into a mold cavity, and a lower cavity of the mold is flat; the gross rubber containing the vulcanizing agent was then placed on the stainless steel sheet having through holes, the mold was closed, the compression molding was conducted at 175° C. for 5 min to obtain a layered complex composed of metal sheet having holes and rubber with a thickness of 0.5-2.5 mm.

Slitting: the polyimide pressure-sensitive adhesive tape adhered to the stainless steel sheet having through holes was torn off, and the layered complex composed of metal sheet having holes and rubber was slit and processed to be a circular layered complex with a diameter of 2-10 mm through mechanical punching or laser cutting, so as to obtain a rubber and metal composite electric contact, the structure of which is shown in FIG. 1.

The testing of initial bonding strength of the layered complex between the metal sheet layer and the rubber, and the testing of bonding strength after a high-temperature and high-humidity aging test at a temperature of 85° C., a relative humidity of 85%, and a duration of 168 h were conducted, and the testing results indicate that bonding failure modes are both cohesive failure. When the rubber is peeled off from the metal sheet, the adhesive surface of the metal sheet always has the rubber residue.

There is no isolation layer between the rubber layer and the metal layer of the electric contact, so no rubber overflows the outer surface of the metal layer. The rubber and metal in the electric contact are combined firmly, thereby eliminating defects caused by rubber overflow. Moreover, because the working surface of electric contact consists of the rubber and soft rubber that does not protrude from the metal layer, the electric contact features dust resistance and oil stain resistance, thereby guaranteeing reliable electrical conductivity, guaranteeing production efficiency and saving production cost.

Comparative Example 1

The stainless steel sheet having through holes in Example 1 was used, but no pressure-sensitive adhesive tape was adhered to one surface of stainless steel sheet having through holes before the stainless steel sheet having through holes was subject to the thermal vulcanization molding with the silicon rubber. The complex made from the silicon rubber and the stainless steel sheet having through holes was slit and processed to be electric contacts with a diameter of 2-10 mm.

Among the electric contacts obtained in Comparative Example 1, about 10-90% of the electric contacts have rubber overflow on the working surface, and some of the electric contacts even lost the function of electrical conductivity. Under the condition that such an electric contact is used in a silicone rubber key, the silicone rubber key will be scrapped. The larger the diameter of the prepared electric contact is, the higher the proportion of the electric contact with rubber overflow becomes.

Comparative Example 2

The smooth and flat 304 stainless steel sheet in Example 1 was vulcanized with silicone rubber after tackifying treatment to obtain a layered complex made from the silicone rubber and the stainless steel sheet. Since the layered complex has no through holes on the stainless steel sheet, there is no rubber overflow problem caused by the silicone rubber passing through the stainless steel sheet.

The surface of the stainless steel sheet of the above layer complex was printed with a layer of alkali-soluble photosensitive ink by a screen plate and then exposed to light, so that the exposed portion was cross-linked into a protective ink layer insoluble in tap water. The portion not exposed to light was dissolved and washed with tap water to reveal the stainless steel sheet surface with a square side length of 0.1-1.0 mm. The distance between adjacent surfaces of the exposed square stainless steel sheet was 0.05-1.0 mm.

The stainless steel sheet after anti-corrosion treatment was put into a corrosion tank with ferric chloride etching solution for etching, same as that in Example 1, and square through holes with a side length of 0.1-1.0 mm evenly distributed on the stainless steel sheet were etched. The stainless steel sheet was taken out, and an alkaline aqueous solution was used to remove the protective ink layer, the stainless steel sheet was then then rinsed with tap water, cleaned with deionized water, and dried in the sun or baked, to obtain a layered complex made from the silicon rubber and the stainless steel sheet having through holes. The layered complex was slit and processed to be electric contacts with a diameter of 2-10 mm, and the working surface of these electric contacts is free from rubber overflow.

The bonding strength between the silicone rubber and the stainless steel of the electric contact obtained in Comparative Example 2 is poor, and the stainless steel and the silicone rubber can be separated through a gentle touch by hand. Some electric contacts even have the phenomenon of self-separation between the stainless steel and the silicone rubber. In contrast, in Example 1, the bonding of the silicone rubber and the stainless steel of the electric contact is firm, and the bonding failure mode when the silicone rubber is peeled off from the stainless steel is the cohesive failure.

Comparative Example 3

Comparative Example 3 adopts a method same as that of Comparative Example 1, but a single-sided polyimide pressure-sensitive adhesive tape with a thickness of 0.025 mm and a 180° peel strength between the stainless steel sheet being 0.25 N/cm was used instead. Among the 500 electric contacts with a diameter of 3.0 mm prepared thereby, 70% of the electric contacts have the phenomenon of rubber overflow, which indicates poor peel strength between the polyimide pressure-sensitive adhesive tape and the stainless steel sheet.

Comparative Example 4

Comparative Example 4 adopts a method same as that of Comparative Example 1, without using a polyimide pressure-sensitive adhesive tape was used, but a polyimide film with a thickness of 0.025 mm without adhesive was used instead. Among the 500 electric contacts with a diameter of 5.0 mm prepared thereby, only 10 of the electric contacts are free from rubber overflow.

It can be seen that the electric contacts prepared in Example 1 are free from rubber overflow that occurred in Comparative Examples 1, 3, and 4, and are free from the bonding failure mode that occurred in Comparative Example 2.

Example 2

Example 2 adopts a method for preparing an electric contact basically same as that in Example 1, but the silicone rubber compound used, in addition to containing 1.0 wt % of peroxide DCP, contains 10-15% of mixed tetramethylbenzene. Same as the method described in Example 1, the method in the present example also uses a polyimide pressure-sensitive adhesive tape, preventing the phenomenon of rubber overflow.

After being prepared, an electric contact was vacuumed in a vacuum oven to a pressure of 0.1 MPa, and dried at 50° C., 100° C., 150° C. and 200° C. for 0.5 h, respectively, so as to remove the mixed tetramethylbenzene and other volatile compounds contained in the electric contact.

Figure 2:
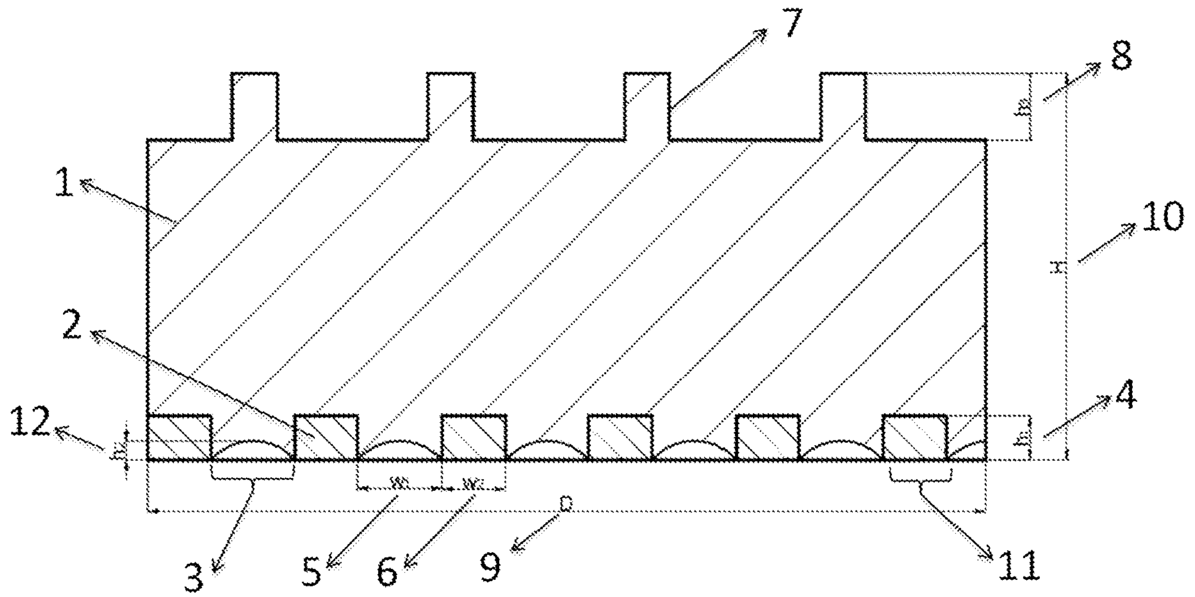
FIG. 2 is a schematic sectional view of a rubber and metal composite electric contact, in which: 1. rubber; 2. metal layer; 3. through hole; 4. thickness of metal; 5. side length of a square through hole; 6. width of metal between adjacent square through holes; 7. cylindrical convex; 8. height of cylindrical convex; 9. diameter of electric contact; 10. thickness of electric contact; 11. working surface of electric contact; and 12. depth of silicone rubber concave.

As the mixed tetramethylbenzene was removed, relative to the working surface of the electric contact (the outer surface of the metal layer), the silicone rubber suffers volume contraction and concave, the structure of electric contact is shown in FIG. 2, and the depth of concave $h_2$ falls within 0.075-0.20 mm.

The electric contact obtained in Example 2 is particularly suitable for applications with violent changes in temperature. Concaves in FIG. 2 can offset thermal expansion of the silicone rubber caused by violent changes in temperature, so as to ensure that the working surface of the electric contact contacts switch components on a PCB, for example, "gold finger" or double half-moon gold points, so that a PCB circuit is connected.

Example 3

Example 3 adopts a method basically same as that in Example 2, but the method for removing the mixed tetramethylbenzene in the electric contact is an extraction method. The present example uses a polyimide pressure-sensitive adhesive tape, so that the electric contact obtained has no problem of rubber overflow.

In order to extract the mixed tetramethylbenzene in the electric contact, the present example selected and used methanol as an extractant through comparative experiments. By using methanol as the extractant, the adhesion between the rubber and the metal was basically not affected by the extraction, and the extraction consumed less energy. The electric contact was put into a Soxhlet extractor and extracted for 2-4 h, about more than 20 times of siphon. After the extraction was completed, the electric contact was taken out and dried, baked in an oven at 70° C. for 1 h to remove methanol or ethanol in the electric contact. The gravimetric method was used to make assessment, the weight loss of the electric contact after the steps of extraction and dryness was equal to the content of the mixed tetramethylbenzene in the original electric contact, so it can be confirmed that the mixed tetramethylbenzene in the electric contact has been extracted and removed.

Same as the electric contact obtained in Example 2, the electric contact obtained in Example 3 is particularly suitable for applications with violent changes in temperature.

Example 4

Figure 3:
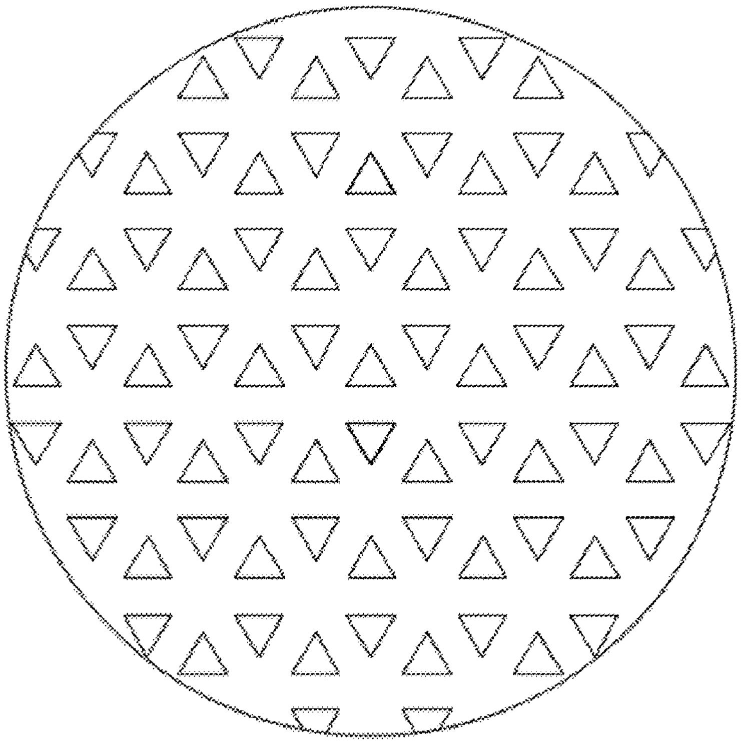
FIG. 3 is a schematic structural diagram of an etched through hole 1.
Figure 4:
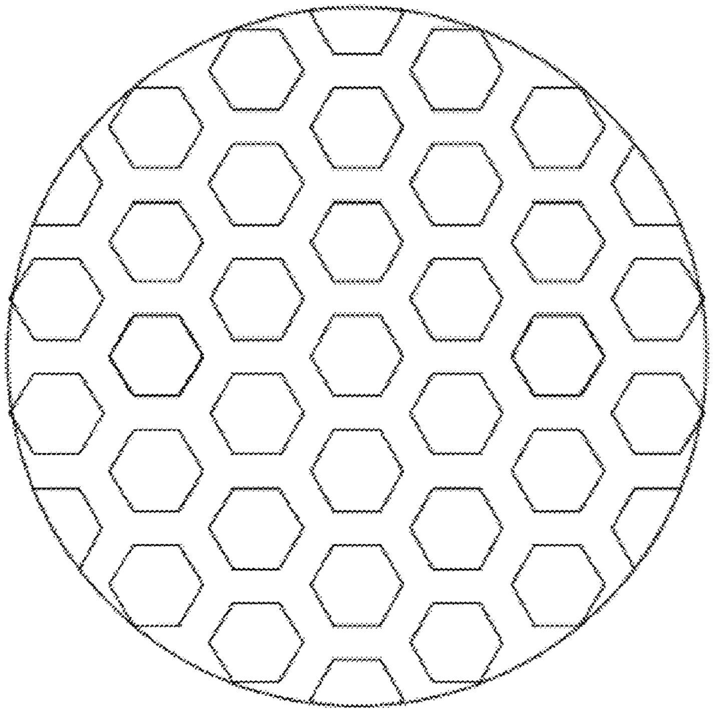
FIG. 4 is a schematic structural diagram of an etched through hole 2.
Figure 5:
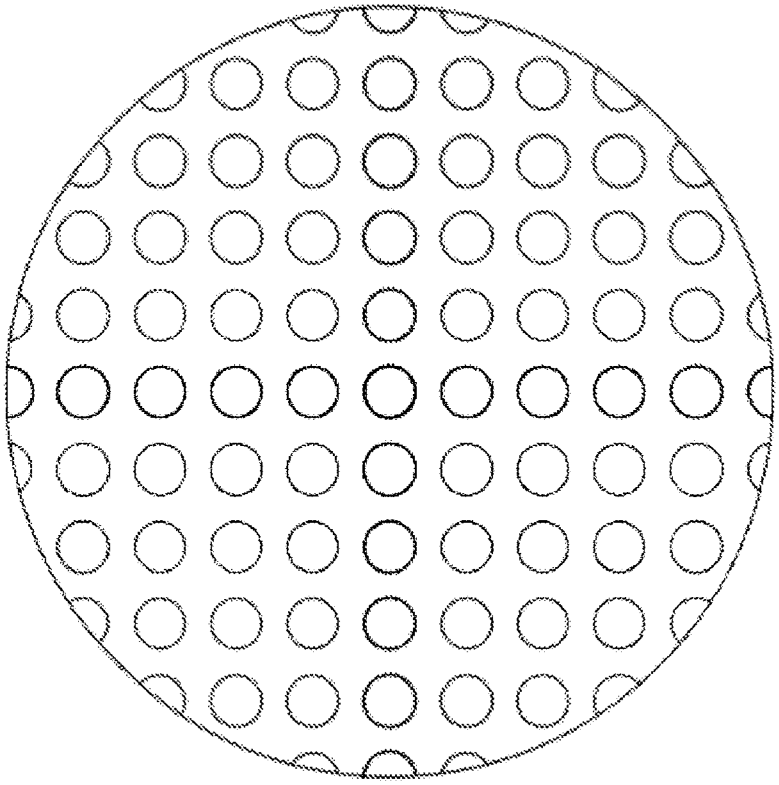
FIG. 5 is a schematic structural diagram of an etched through hole 3.

The present example adopts a method basically consistent with that in Example 1, but through holes in a shape of equilateral triangle (as shown in FIG. 3), regular hexagon (as shown in FIG. 4) or circle (as shown in FIG. 5) were etched on the stainless steel sheet.

With respect to electric contacts made from the stainless steel sheet that was made from the stainless steel sheet of the same material, thickness and hardness and that was evenly distributed through holes in equilateral triangle, regular hexagon or circle, under the condition that the side length and the distance between adjacent through holes were the same, electric contacts made from the stainless steel sheet with evenly distributed through holes in equilateral triangle had the greatest overall mechanical strength (measured by the capacity of bending resistance felt by hand), followed by those made from the stainless steel sheet with evenly distributed through holes in square, and then those made from the stainless steel sheet with evenly distributed through holes in regular hexagon. It can be seen that the overall strength of this type of electric contact can be adjusted according to the type, size and the like of through holes.

Example 5

Electric contacts made from the stainless steel sheet with evenly distributed circular through holes prepared in the above examples were subjected to an electroless nickel-plating, with the thickness of the nickel-plating layer being 0.5-5 μm, or were subjected to an electroless silver-plating first and then an electroless gold-plating, with the thicknesses of the silver-plating layer or the gold-plating layer were 0.5-5 μm and 0.05-0.50 μm, respectively. The objective of electroless nickel-plating, or electroless silver-plating and electroless gold-plating is to reduce the contact resistance of the working surface of the electric contact, especially the electroless gold-plating can significantly reduce the contact resistance of the working surface of the electric contact, so as to improve the electrical conductivity and service life of the electric contact.

The present invention is not limited to the above examples, and anyone should know that any products in various forms made under inspiration of the present invention, irrespective of any changes in shapes or structures thereof, which have the same or similar technical solutions as the present invention, shall fall within the protection scope of the present invention.

What is claimed is:

1. A rubber and metal composite electric contact, wherein the electric contact is a circular layered complex which is formed by tightly combining a metal sheet layer having a plurality of through holes and a rubber layer by means of thermal vulcanization molding and which has a diameter of 1 mm to 15 mm, wherein the metal sheet layer has a thickness of 0.005 mm to 0.5 mm, the layered complex has a thickness of 0.1 mm to 5 mm, and an outer surface of the rubber layer has cylindrical, pillar-shaped, prismatic or hemispherical convexes with diameters of cross-sectional circumcircles less than or equaling to 1 mm and heights of 0 mm to 4.75 mm; the metal sheet layer and the rubber layer are combined firmly, and there is no isolation layer or transition layer between the rubber layer and the metal layer; the through holes in the metal sheet layer are filled with the rubber but the rubber does not protrude from an outer surface of the metal sheet layer; and no rubber is adhered to the outer surface of the metal sheet layer, therefore, there is no problem of rubber overflow.

2. The rubber and metal composite electric contact according to claim 1, wherein the metal sheet layer and the rubber of the rubber and metal composite electric contact is firmly bound, a failure mode of an initial bonding between the metal sheet layer and the rubber and a bonding failure mode after a high-temperature and high-humidity aging test at a temperature of 85° C., a relative humidity of 85%, and a duration of 168 h are both cohesive failure; when the rubber is stripped or peeled off from the metal sheet layer, an adhesive surface of the metal sheet layer has an area of a rubber residue not lower than 10% of the total bonding area.

3. The rubber and metal composite electric contact according to claim 1, wherein the metal sheet layer of the rubber and metal composite electric contact has a plurality of holes with through-hole types and being evenly distributed or randomly distributed, and the holes in the metal sheet layer are partially or completely filled with rubber, and no rubber is adhered to the outer surface of the metal sheet layer, therefore, there is no problem of rubber overflow.

4. The rubber and metal composite electric contact according to claim 1, wherein holes of the metal sheet layer have a hole diameter of 50 μm to 1.0 mm and a hole spacing of 25 μm to 1.0 mm, and cross-sections of the holes are axisymmetric or centrosymmetric circles, ellipses, rectangles, rhombuses, isosceles trapezoids, or regular polygons.

5. The rubber and metal composite electric contact according to claim 1, wherein the rubber in the rubber and metal composite electric contact is natural rubber, ethylene propylene rubber, ethylene propylene diene monomer rubber, diene rubber, acrylic ester rubber, polyurethane rubber, liquid silicone rubber, solid silicone rubber, fluorosilicone rubber or thermoplastic elastomer.

6. The rubber and metal composite electric contact according to claim 1, wherein the rubber in the rubber and metal composite electric contact is a self-adhesive liquid silicone rubber or a self-adhesive solid silicone rubber; when the self-adhesive liquid silicone rubber or the self-adhesive solid silicone rubber is used, there is no need to perform a pre-treatment of tackifying the metal sheet layer, the firmly bonding of liquid silicone rubber or solid silicone rubber is obtained when being compounded with the metal sheet layer during vulcanization molding.

7. The rubber and metal composite electric contact according to claim 1, wherein the rubber in the rubber and metal composite electric contact contains 1 wt % to 50 wt % of volatile substances, extractable substances or soluble substances before being compounded with the metal sheet layer through thermal vulcanization molding; the volatile substances contained in the rubber before being compounded with the metal sheet layer through thermal vulcanization molding in the rubber and metal composite electric contact are organic solvents with a boiling point higher than a temperature of thermal vulcanization molding, or iodine, 1,2,4,5-tetramethylbenzene, mixed tetramethylbenzene, p-dichlorobenzene, phenol, adamantane, naphthalene, anthracene, phenanthrene, camphor, menthol or caffeine; the extractable substances or the soluble substances contained in the rubber before being compounded with the metal sheet layer through thermal vulcanization molding in the rubber and metal composite electric contact are water-soluble inorganic salts or organic salts, surfactants, sugars, fats, organic amines, alcohol amines, monosodium glutamate, amino acid, oxalic acid, simethicone, liquid paraffin, chlorinated paraffin, naphthalene, tetrahydronaphthalene, decahydronaphthalene, trimethylbenzene, 1,2,4,5-tetramethylbenzene, mixed tetramethylbenzene, hexamethylbenzene, or organic solvents or oils with a boiling point higher than 175° C.

8. The rubber and metal composite electric contact according to claim 1, wherein the metal sheet layer in the rubber and metal composite electric contact is made from aluminum, iron, cobalt, nickel, copper, zinc, tin, manganese, tungsten, silver, gold, or homogeneous or non-homogeneous metal materials composed of alloys thereof; the metal sheet layer is made of one layer of metal material, or is compounded by two or more of layer, and the metal sheet layer contains a metal plating layer; an inner surface of the metal sheet layer or the inner surface and an outer surface of the metal sheet layer is or are coated with a layer of bonding promoter, coupling agent or primer with an average thickness not greater than 1 μm.

9. A preparation process for the rubber and metal composite electric contact according to claim 1, comprising following steps:

cleaning treatment: cleaning a smooth and flat stainless steel sheet with a thickness of 0.005 mm to 0.5 mm to remove dust, particles, oil stains and rust spots on a surface of a metal sheet and keep the surface of the metal sheet clean;

anti-corrosion treatment: adhering a pressure-sensitive adhesive tape or a pressure-sensitive adhesive sheet with a polyester or a polyimide film as a substrate to one side of the cleaned metal sheet; protecting the one side of the metal sheet completely with a protective ink or a coating, and protecting a portion of another side of the metal sheet that does not need to be etched with an ink or a coating, so that a metal surface that needs to be etched is exposed, so as to be etched into through holes by a suitable etchant;

etching: putting the metal sheet after the anti-corrosion treatment into a corrosion tank for etching, etching holes with through-hole type onto the metal sheet by a chemical or an electrochemical method, taking out the metal sheet, using solvent or alkaline aqueous solution to remove the protective ink or the coating to make it clean;

tackifying treatment: when a non-self-adhesive rubber is used as the rubber, treating one side of the obtained metal sheet that has been bonded to the rubber, or both sides of the obtained metal sheet with a bonding promoter, a coupling agent or a primer that is capable of increasing the bonding strength of the metal sheet and the rubber, wherein the bonding promoter, the coupling agent or the primer treats a dry film deposited on the metal sheet by a thickness less than 1 μm; when a self-adhesive rubber is used as the rubber, the tackifying treatment can be omitted since the self-adhesive rubber is a rubber capable of firmly bonding with the metal sheet without tackifying treatment by means of thermal vulcanization molding;

thermal vulcanization molding: putting the metal sheet obtained in the anti-corrosion treatment and protected by the pressure-sensitive adhesive tape or the pressure-sensitive adhesive sheet with a thermal-resistant polymer film as a substrate into a flat-bottomed mold, or removing the pressure-sensitive adhesive tape or the pressure-sensitive adhesive sheet with the thermal-resistant polymer film as the substrate that protects the metal sheet during the anti-corrosion treatment, adhering the pressure-sensitive adhesive tape or the pressure-sensitive adhesive sheet with the thermal-resistant polymer film as the substrate to one side of the metal sheet, and then putting the metal sheet into the flat-bottomed mold, or adhering the pressure-sensitive adhesive tape or the pressure-sensitive adhesive sheet with the thermal-resistant polymer film as the substrate to one side of the metal sheet that is completely protected with the protective ink or the coating during the anti-corrosion treatment, then putting it into the flat-bottomed mold, and putting the gross rubber containing a vulcanizing agent on the metal sheet and close the mold to perform the thermal vulcanization molding to obtain a layered complex composed of metal sheet having holes and rubber with a thickness of 0.1 mm to 5 mm; the thermal-resistant polymer film is a polymer film that does not shrink significantly and remains solid within 15 min at the vulcanization molding temperature of the used rubber, or a polyester film, a polyurethane film or a polyimide film of which the heat deflection temperature is higher than the vulcanization molding temperature of the used rubber; and slitting: tearing off the pressure-sensitive adhesive tape or the pressure-sensitive adhesive sheet with the thermal-resistant polymer film as the substrate attaching to the metal sheet with holes; extracting volatile substances or extractable substances contained in the rubber of the layered complex composed of the metal sheet having holes and rubber through heating before or after slitting processing; and slitting and processing the layered complex composed of the metal sheet with holes and rubber to be a circular layered complex with a diameter of 1 mm to 15 mm through mechanical punching or laser cutting, to obtain a rubber and metal composite electric contact.

10. The preparation process for a rubber and metal composite electric contact according to claim 9, wherein the 180° peel strength between the pressure-sensitive adhesive tape with the thermal-resistant polymer film as the substrate and the metal sheet is 1 N/cm to 15 N/cm.

* * * * *